(12) United States Patent
Porat

(10) Patent No.: US 7,961,638 B2
(45) Date of Patent: Jun. 14, 2011

(54) ROUTING METHOD AND SYSTEM

(75) Inventor: Haim Porat, Tel-Aviv (IL)

(73) Assignee: Tejas Israel Ltd, Herzelia Pituach (IL)

(*) Notice: Subject to any disclaimer, the term of this patent is extended or adjusted under 35 U.S.C. 154(b) by 996 days.

(21) Appl. No.: 11/335,955

(22) Filed: Jan. 19, 2006

(65) Prior Publication Data

US 2006/0159020 A1 Jul. 20, 2006

(30) Foreign Application Priority Data

Jan. 19, 2005 (IL) .......................................... 166390

(51) Int. Cl.
*H04L 12/26* (2006.01)

(52) U.S. Cl. ...................................................... 370/252

(58) Field of Classification Search .......... 370/230–240, 370/252, 395
See application file for complete search history.

(56) References Cited

U.S. PATENT DOCUMENTS

| | | | | |
|---|---|---|---|---|
| 5,940,373 A * | 8/1999 | Chiu et al. | ...................... | 370/238 |
| 6,209,033 B1 * | 3/2001 | Datta et al. | ...................... | 709/224 |
| 6,400,681 B1 * | 6/2002 | Bertin et al. | ...................... | 370/218 |
| 6,487,604 B1 | 11/2002 | Rochford et al. | | |
| 7,240,124 B2 * | 7/2007 | Schwartz et al. | ............. | 709/238 |
| 2002/0071389 A1 | 6/2002 | Seo | | |
| 2002/0150041 A1 | 10/2002 | Reinshmidt et al. | | |
| 2002/0174246 A1 | 11/2002 | Tanay et al. | | |
| 2003/0037276 A1 * | 2/2003 | Mo et al. | ........................... | 714/4 |
| 2003/0039212 A1 * | 2/2003 | Lloyd et al. | .................... | 370/235 |
| 2003/0126246 A1 | 7/2003 | Blouin et al. | | |
| 2003/0189936 A1 * | 10/2003 | Terrell et al. | ............. | 370/395.31 |
| 2003/0204768 A1 * | 10/2003 | Fee | ................................... | 714/4 |
| 2004/0208125 A1 * | 10/2004 | Damon et al. | ................ | 370/235 |
| 2005/0094572 A1 * | 5/2005 | Mimura et al. | ............... | 370/252 |

FOREIGN PATENT DOCUMENTS

| | | |
|---|---|---|
| JP | 2004528775 | 9/2004 |
| WO | 03041342 | 5/2003 |
| WO | WO2004/021650 A | 3/2004 |

* cited by examiner

*Primary Examiner* — Melvin Marcelo
(74) *Attorney, Agent, or Firm* — Deborah Gador

(57) ABSTRACT

A method for routing data over a telecommunications carrier network including at least two switching devices defining at least one physical link, the method including defining in advance a plurality of traffic flows, each associated with specific routing through at least one of the physical links in the network; configuring a routing system according to the traffic flows; collecting data of traffic transmitted over at least some of the traffic flows, calculating traffic statistics, from the collected data, for each of the flows in the network; and re-calculating the routing system configuration utilizing the calculated traffic statistics.

35 Claims, 4 Drawing Sheets

ROUTING METHOD AND SYSTEM

FIELD OF THE INVENTION

The present invention relates to a routing method and system for a telecommunications carrier network, in general, and, in particular, to a method and system for routing data traffic over a telecommunications carrier network.

BACKGROUND INFORMATION

Packet switched networks are generally (at the data link layer), connectionless, shared bandwidth networks which interconnect nodes in an arbitrary way. In order to establish a connection between the nodes for transmission of data, a routing mechanism is required. Current routing protocols are designed to cope with dynamic and unpredictable volumes of data transfer through networks that are characterized by dynamic topology composed of many nodes that communicate with each other in an arbitrary and random way. These networks are typically enterprise networks or the Internet. To address these problems, routing protocols are adapted to cause each router to continually learn the network topology and continually collect information about traffic status throughout the network, take note of the volume of data being routed through each node, calculate optimized routes for each possible connection and update routing tables at each routing node. Thus, each router computes, independently of the other routers, its own routing table, which is the basis for its forwarding decisions. The information is based on local (adjacent hops) information, as the individual routers have no knowledge of the overall traffic load or performance in the network. Therefore, it is sub-optimal, on one hand, as it does not take into account the other nodes in the network, while heavily burdening the routing node, on the other hand.

U.S. Patent Application 20020150041 to Reinshmidt, et al. describes a method and system for improving the quality of service for transportation of selected data packets over an IP-based data network, such as the Internet. The method utilizes servers in the customer's environment, each of which serves as a source node or destination node. Preferably, for each link, several alternative paths are preselected. The servers contain unique software which allows the servers to exchange test packets between them to monitor and analyze the transportation parameters of each alternative path. When an optimal path is identified, the server modifies the header of the data packet, thereby causing the data packet to be forwarded to the destination node via the selected optimal path(s).

In this method, the paths are monitored between pairs of nodes and not globally. Furthermore, the data is not collected over time, so the routing decision is based only on instantaneous information at any given moment.

U.S. Patent Application 2002/0174246 to Tanay, et al. describes a centralized system that computes routing tables for routers in an IP protocol network, and removes the task of computing routes from the individual routers. This system includes a network traffic statistics gathering system, a matrix formation and optimization system for classifying the traffic into classes and computing optimized routes for every traffic class according to the traffic statistics, and a distribution system for distributing routing tables, including information concerning the optimized routes, to the individual routers. This system, which is limited in use to an IP networking system, must learn the new topology state of the network whenever there is a change of any sort. Since these computations are required continually, the network is burdened with large quantities of computations, and automatically "updates" routing tables, substantially in real time, even if there are no changes, thereby slowing down data transfer in the network as a whole.

It will be appreciated that updating of routing tables or reconfiguration in these Internet-type networks occurs continually, without regard to any specific criteria. Rather, the rate of reconfiguration in networks using these systems is determined by the size and complexity of the network, the quantity of calculations, and the speed of calculation and updating the routing tables by the system.

Carrier transport networks, for example, metro area networks, which are used to transport core data traffic, do not resemble enterprise networks or the global Internet. Rather, the carrier transport network is a conventional telephony network, and is characterized by different attributes:

The logical network's topology is usually mesh based.

The physical network is usually ring based.

The network consists of well-defined autonomous routing domains.

Each node is connected to specific node(s) within each domain.

Available routes are known and limited in number, and are static until the topography of the network changes.

All traffic of one service from one node within each routing domain is destined to a relatively small, finite and constant group of nodes.

These networks suffer from the disadvantage that they are inefficient. In order to ensure that all required traffic is transported over the network within a reasonable time, the network is often under-utilized. Thus, empty frames are often sent over the network.

Furthermore, it will be appreciated that the complex routing protocols described above, designed for generalized global and dynamic topology networks, which require constant updating of routing tables in accordance with the actual state of the various nodes in the network, are not suitable for establishing routes in the routing domain of a carrier network, such as a metro network. This is because they are too complex, and they are not resource efficient or cost efficient.

Accordingly, there is a long felt need in the art for a routing method and system for metro and sub-networks of carrier networks, and so forth, having the stability and reliability of conventional carrier systems, and it would be desirable to have such a routing system which is as flexible and adaptable as are systems of conventional global networks.

SUMMARY OF THE INVENTION

In accordance with an exemplary embodiment of the present invention a method is provided for increasing efficiency in relatively stable carrier or metro networks by utilization of traffic data to calculate statistics, particularly statistics of the entire network. For purposes of the present application, the term "network" refers to metro networks or carrier networks, unless otherwise stated, and the term "network statistics" or "global statistics" means statistics concerning data traffic flow through the entire network calculated from traffic data collected from some or all of the traffic flows through the network. It has now been appreciated that, since the various routes through carrier networks are known in advance and relatively unchanging, when upgrading carrier networks to packet or frame-based metro networks, it may be inefficient to constantly check the state of traffic at the various nodes and replace routing tables, as in IP and similar networks. A much more efficient system is proposed in the exemplary embodiment of the present invention, which takes advantage of the specific characteristics of carrier networks, namely controlled and sustainable behavior and topology. The present system is based on a central routing system that utilizes an off-line algorithm which computes and periodically updates routing tables for all the network devices (switches, routers, etc.) of the network based on global traffic statistics of the entire network, and only when pre-defined criteria have been met. The routing table optimizes the network's throughput taking into account the topology, network load statistics, and a set of Service Level Agreements (SLAs) (which define the services the network provider will furnish to each customer). Periodically the routing is optimized according to load statistics collected from the network devices over time taken together with pre-defined network parameters.

According to an exemplary embodiment of the present invention, all traffic through the core network is assumed to be associated with one of a predefined set of flows (or logical links). Each flow is associated with specific source and destinations and, optionally, Quality of Service (QOS) requirements. These definitions are "quasi-static", i.e., the flow's SLA and source and destinations are static for a relatively long period of time and only change when the network changes. Thus, the routing schemes may also be quasi-static, i.e. fixed for relatively long periods of time, and change only when pre-selected criteria are met.

According to one exemplary embodiment of the present invention, the network is an Ethernet network. In this case, the core network may be implemented using, e.g., standard equipment. In this case, the equipment implements Ethernet switching, i.e., it correctly directs packets according to their MAC addresses in the context of the network's topology.

According to a preferred embodiment of the invention, the exemplary method is implemented in layer 2, the data layer of the telecommunications network. At this layer, it may be much simpler, more efficient, may require fewer calculations, and may be less expensive to change the routing of the data, which has not yet been processed. Alternatively, it is possible to implement the exemplary method of the invention in other network layers, such as layer 3 (static IP routing) or network layer 1 (Lambda routing).

There is thus provided, in accordance with the present invention, an exemplary method for routing data over a carrier network, the exemplary method including defining a plurality of traffic flows, each associated with specific routing through at least one physical link in the network, configuring a routing system according to the traffic flows, collecting or calculating data of traffic through each of said traffic flows, calculating, from the collected data, traffic statistics for each traffic flow in the network, and re-calculating the routing system utilizing the calculated traffic statistics.

According to one exemplary embodiment of the present invention, the method further includes defining at least one pre-selected criterion for routing scheme recalculation, and recalculating the routing scheme when one of the pre-selected criteria is met.

According to a preferred embodiment of the present invention, the network is an Ethernet network.

According to one exemplary embodiment, the routing system is reconfigured when traffic flows are added or removed or interrupted.

According to a preferred embodiment, the step of collecting includes collecting statistical information regarding the state of traffic through at least some of the logical links, and the step of calculating includes processing the collected information to provide traffic statistics of all the logical links in the network, such as mean and variance distribution of bandwidth demand and actual throughput. The system may also consider other criteria for triggering route computation as detailed below. An alternative routing scheme is then computed, and its effect on a chosen network metric, is calculated and compared to the current value of the metric, such as total network throughput (total bandwidth delivered by the network). If the new routing scheme has improved metrics, based on statistical values, such as percent improvement of the metric, and/or the probability that the metric value will be improved, and/or time thresholds, such as a minimum period of time between successive changes selected in advance by the end user, the network is reconfigured to the new routing scheme.

According to one exemplary embodiment of the present invention, the pre-selected criteria for computing a new routing scheme may include one or all of the following re-occurring events:

A change in network topology

A change in at least one logical link

A change of selected traffic statistics, for example, bandwidth utilization above a pre-defined probability threshold value (based on a function of distribution of bandwidth utilization mean and variance over time), of at least one logical link, or the ratio of peak bit rate versus average bit rate.

Lapse of a pre-set period of time

Further according to a preferred embodiment, the routing system may be reconfigured when long term network traffic statistics (collected off line over a relatively long period of time (which can be hours, days, weeks, or months)) indicate, with a probability above a user defined threshold value, a repeating pattern of bandwidth utilization that triggers computation of a better routing scheme in terms of bandwidth throughput.

Preferably, each configurable switching device is adapted and configured to collect traffic information about its own links, and transmit the collected information to the management station for processing.

According to a preferred embodiment, the management station includes a computer program for defining a routing scheme for routing the data through the network, for configuring the network devices according to the routing scheme, for determining whether at least one pre-selected criterion for reconfiguring the network devices has been met, for re-defining the routing scheme when at least one of the criteria has been met, and for reconfiguring the network according to the re-defined routing scheme, preferably all off-line.

According to an alternative embodiment, each network device includes an identical computer program for defining a routing scheme for routing the data through the network, for all configuring the network devices according to the routing scheme, for determining whether at least one pre-selected criterion for reconfiguring the network devices has been met, for re-defining the routing scheme when at least one of the criteria has been met, and for reconfiguring the network according to the re-defined routing scheme, preferably all off-line.

BRIEF DESCRIPTION OF THE DRAWINGS

The present invention will be further understood and appreciated from the following detailed description taken in conjunction with the drawings in which.

DETAILED DESCRIPTION OF EXEMPLARY EMBODIMENTS OF THE PRESENT INVENTION

Figure 1:
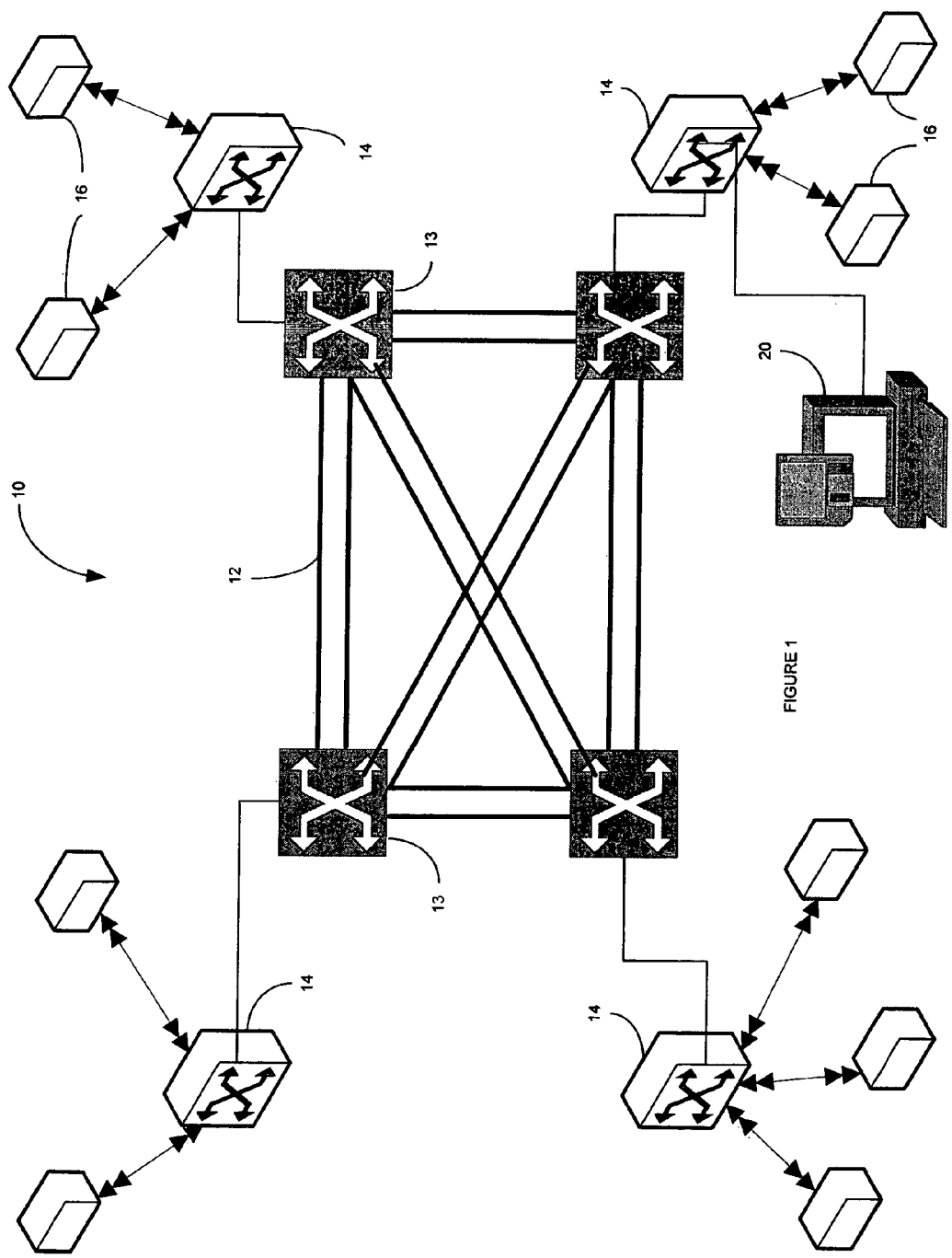
FIG. 1 is a schematic illustration of a communications network constructed and operative in accordance with one embodiment of the present invention.

The present invention relates to a central routing system and method for packet or frame-based data flow through a telecommunications carrier network. In this system, all traffic through a core network is associated with one of a predefined set of flows (logical links) and physical links, each associated with specific source and destinations and, optionally, Quality of Service (QOS) requirements. It will be appreciated that these associations are "quasi-static", that is, the flow routes are unchanging for a relatively long period of time. Thus, the routing scheme is generally changed only when the network changes. In addition, the routing scheme is changed when other pre-defined criteria are met, most particularly in response to network traffic statistics, which are calculated from network traffic data continuously collected by at least some of the network devices. The routing system utilizes an off-line algorithm which, when these criteria are met, computes and updates routing tables for each of the network devices of the network, based on network topology, network load statistics, and a set of Service Level Agreements (SLAs). It is a particular feature of an exemplary embodiment of the present invention that the resulting routing schemes are also quasi-static, i.e., they are not updated or changed for a period of time which is long relative to the data transfer rate, but only when these pre-defined criteria are met.

The exemplary system of the present invention may have several advantages relative to the prior art. First, the system may be able to offer better quality of service to various users than is available in conventional carrier networks. Second, the system may provide a distribution of the network resources which is more in accordance with the preferences of the customer, meaning that the network's resources are fully controlled and are constantly distributed (using the quasi-static mechanism) to be substantially optimized according to customer preferences (even distribution of data, maximum throughput etc.). Third, network resources may be more efficiently utilized, since it is not necessary to save bandwidth for peak times, which is not utilized at other times. In addition, the present system may provide faster adaptation of the network to topology and link scheme changes than conventional networks, because changes of network requirements are input directly to the system, as by the user, instead of using traffic protocol extrapolations, such as used by IP protocol. Finally, since changes in topology are not constantly monitored, there is less computational burden on the routing system, so it has better performance. Thus, the system and routers need not waste time and network resources continually learning the current state of the network and replacing all the routing tables, even when they are unchanged, as occurs in the prior art.

While the present invention will be described in detail hereinbelow with regard to a telecommunications network, particularly an Ethernet network, it will be appreciated that the method of quasi-static routing described herein is equally suited to use in any controllable routing domain in other carrier networks requiring re-routing for optimum use of network resources, such as IP router, and also for storage area networks.

One example of proposed architecture for a network 10 utilizing the routing system of the present invention is shown schematically in FIG. 1. For purposes of the present invention, a "network" is any carrier routing domain in which all of its physical and logical links, and all ingress traffic, are controllable by the routing system. In FIG. 1, the network 10 has the following elements: A core network 12, including a plurality of core network devices 13, here illustrated as four in number, and a plurality of configurable switching edge devices 14 coupled to the core network 12. In this embodiment, network 10 implements Ethernet switching. The configurable edge devices 14 can be configured by various users of the system, by inputting required data, as described below. At least one customer 16, having a service agreement with one of the users, is coupled to each configurable switching device 14. Each configurable switching device 14 is able to utilize static forwarding or routing tables for transmitting data traffic through the core network 12, and is able to collect traffic data from all of its links, using any management protocol. It will be appreciated that the network may include physical links connecting the switching devices in any topology.

A management station 20 is coupled to all the switching devices 14 for two-way communication. In the illustrated embodiment, the management station is coupled to the switching devices for in-band management. Alternatively, the management station may be physically coupled to each switching device for out-of-band management. The management station 20 includes a suitable processor (not shown), and includes an appropriate computer program (e.g., computer instructions stored on a non-transitory computer-readable medium) for implementing the exemplary method of the present invention, according to an algorithm described in detail below.

The exemplary routing system of the present invention operates as follows. A routing domain or metro network of a carrier network to be managed is arranged according to a desired topology, and a management station coupled to the various network devices. It will be appreciated that, for purposes of the present invention, any network device, such as a switch, router, etc., which is capable of implementing management instructions (i.e., utilizing and updating routing tables), and which is capable of collecting and forwarding traffic data, can be utilized in a link in the network. The management station can manage both network devices in the core network and edge devices coupled to various users, who wish to transmit and receive data traffic.

Details of the topology of the network, the physical links required by the various customers, and required flows (logical links) are parameters which are input (e,g, via a user interface including, e.g., an input device such as a keyboard, a mouse, and/or a graphical user interface), into the management station. A preliminary provisioning table is generated from this data and optimal routes, based only on these input parameters, are computed. Appropriate routing tables are generated and each of the network devices is configured accordingly. The network begins to run using these static routes and continues to run unchanged until pre-defined criteria are met. While the network is operating, a number of switching devices throughout the network continuously collect data regarding traffic over each route. This data is stored in the network and processed to provide traffic statistics. According to a preferred embodiment, all the network devices, both core devices and edge devices, collect and transmit data of traffic entering and leaving that device. According to an alternative embodiment, only the edge devices collect traffic data since, using statistics only from the edge devices, it is possible to extrapolate the statistics of the core devices, as all ingress and egress ports are monitored and all routes are known. According to yet another embodiment, traffic data is only collected in a limited number of devices, which are sufficient to extrapolate all traffic statistics for the entire network.

According to the exemplary embodiment of FIG. 1, all the collected data are sent to the management station for storage and for processing off-line.

In this embodiment, a number of criteria for reconfiguration of the network devices are also input into the management station, any one of which is sufficient to trigger recalculation of the routing scheme and possible reconfiguration of the network. Some examples of suitable criteria are as follows, although other criteria may be selected by the user, in addition to or instead of these criteria. A first criterion is a change in network topology due to the addition or removal of a physical link. A second criterion is a change in provisioning or flows of at least one logical link over the existing topology. In each of these cases, the user inputs (via, e.g., a user interface) new parameters for the network, the routing scheme is re-defined, and updated routing tables are generated, all off-line. The updated routing tables are provided to each network device together with instructions for synchronization of reconfiguration of the devices, at which time the network changes to the new static route scheme.

According to the present invention, the system may also consider other criteria for triggering route computation. According to one embodiment of the present invention, the pre-selected criteria for computing a new routing scheme may include one or all of the following additional events:

A change in one or more selected traffic statistic, for example, bandwidth utilization above a pre-defined probability threshold value (a function of distribution of bandwidth utilization mean and variance over time) of at least one logical link.

Lapse of a pre-selected period of time since the previous computation or reconfiguration.

A repeating pattern of bandwidth utilization above a user defined probability value, size of change, and length of time threshold value, for example, a repeated reduction in certain locations from Friday afternoon to Sunday evening.

Once the new routing scheme is calculated, additional criteria may be utilized in order to determine whether or not to reconfigure the network according to the newly calculated routing scheme. The preferred criterion is the probability that the newly calculated routing scheme will provide improved performance (improvement of one or more network metrics) as compared with the current routing scheme. Thus, once the alternative routing scheme is computed, its effect on total network throughput or other metrics detailed hereafter (even distribution, minimal delay, etc.) is calculated and compared to current network metrics. If there is no improvement or if the level of improvement does not reach a pre-set threshold value, the routing tables will not be updated at this time. If the improvement is expected to be greater than a pre-set threshold value, and the probability that the improvement will have this value reaches a minimum pre-set threshold value, for example, a 90% probability that the throughput will increase by at least 10%, and if a time threshold of a minimum period of time between successive route changes pre-selected by the end user is met, updated routing tables are prepared according to the new routing scheme and provided to each network device, together with instructions for synchronization of reconfiguration of the devices, at which time the network changes to the new static route scheme.

Change of bandwidth utilization may be determined as follows. For each logical link, the user of that link selects a minimum permitted value of the probability of bandwidth utilization (for example, 95%) and a minimum period of time over which that probability must remain in order to trigger recalculation of the routing scheme. According to the present invention, the information collected in the network regarding the actual data traffic (the measured bandwidth utilization at each measuring point in time) may be received and stored by the management station, which calculates traffic statistics, including the mean and variance distribution over time and, from these, the probability value of bandwidth utilization, for each of the logical flows.

The user may determine that, after each certain pre-selected period of time, such as one day, he desires to confirm that the network is working at an optimum level. By entering this pre-selected period of time as one of the recalculation criteria, he ensures that periodically the routing scheme is recalculated and its probable performance compared with current performance. When the probable performance of the recalculated routing scheme provides improved metric values, as compared with the current performance, the network will be reconfigured.

Yet another exemplary criterion for recalculation of the routing scheme is the discovery of a repeating pattern of bandwidth utilization. It will be appreciated that, since traffic statistics are collected continually from all over the network and stored in the management center, long term statistics of network traffic collected off line over a long period of time (hours, days, weeks, or months), can also be studied and utilized for optimization of the routing scheme. When these long term statistics indicate a probability above a user defined threshold of a repeating pattern of bandwidth utilization, for example, similar patterns of utilization over each weekend which differ from weekday patterns, or an increased use by one customer every day at a fixed hour for ten minutes, computation of a new routing scheme is triggered, which is then compared with the current routing scheme in terms of bandwidth throughput or other selected metrics pre-defined by the user.

The method of operation, according to a preferred embodiment of the present invention, will now be described with relation to FIGS. 2, 3, and 4, flow charts illustrating the method. The method of operation can be divided into three major tasks:

1. Network initialization or "cold start"—the initial learning and configuration of the network, schematically illustrated in FIG. 2.
2. Network run-time—the on-going mode of operation, wherein the network is able to adapt the routing scheme to traffic patterns, in order to optimize the use of network resources, schematically illustrated in FIG. 3, and
3. Configuration change—either a change in topology (a change in the physical links required (e.g., adding and/or removing physical links)), or a change in logical links, e.g., adding and/or removing flows, schematically illustrated in FIG. 4.

Figure 2:
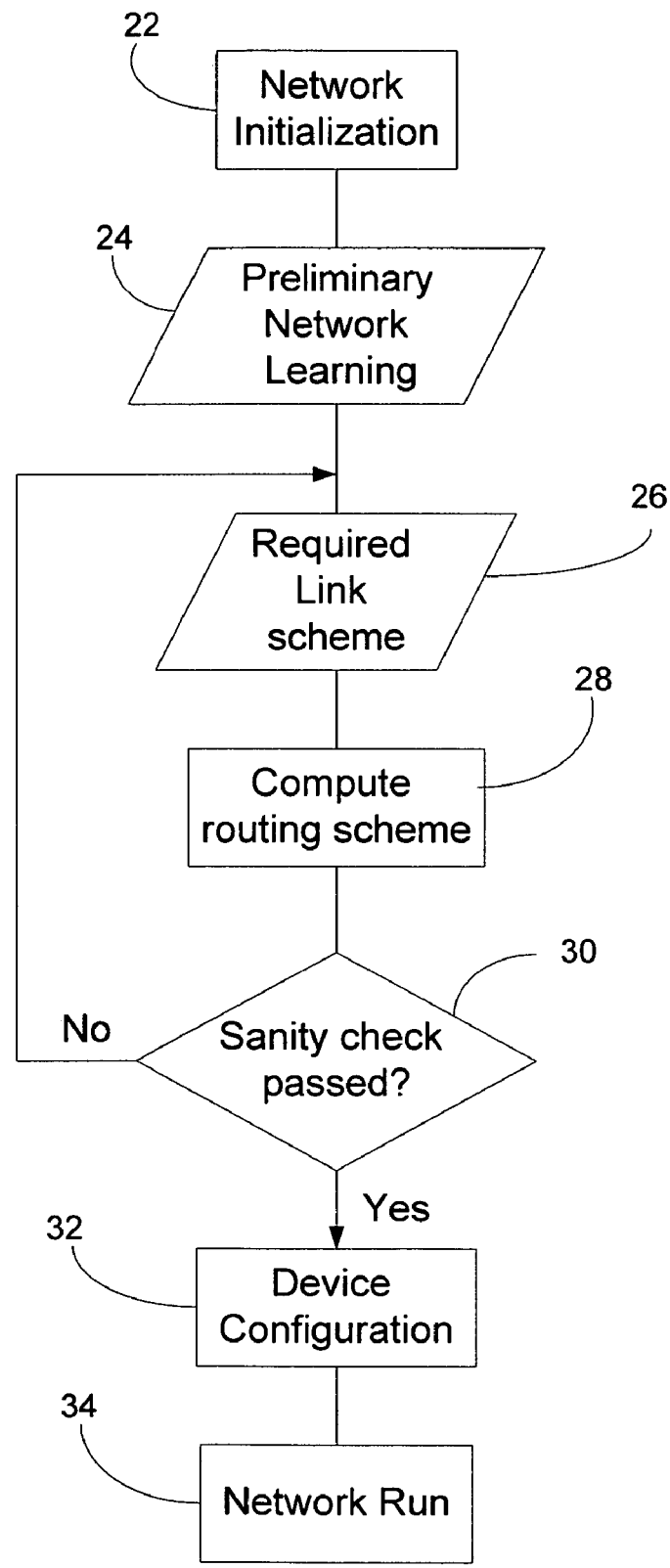
FIG. 2 is a flow chart illustrating network initialization according to one embodiment of the invention.

Referring now to FIG. 2, there is shown a flow chart illustrating a network initialization (block 22) according to one embodiment of the invention. The network is assumed to be not configured, but it is a prerequisite that the network operator know the network parameters as detailed hereunder and the required services and/or logical links. The network initialization or "cold start" includes several initial processes designed to allow the network to start operating in a stable and efficient (if not optimal) way from point zero. Thus, an initial division into flows and routes is provided for the start of operation of the network.

At the start, preliminary network learning is provided (block 24). In order for the management station to know the network topology so it can compute routes for the data traffic through the network, initial parameters for the network must be input into the management station, either manually or using automatic learning protocols. These parameters include:

1. The number of switches available in the network;
2. The number of ports on each switch and their unique identifiers;
3. The available bandwidth on each port;
4. The physical connection scheme of the network elements—i.e. which port is connected to which other port by which physical link;
5. The required logical links, with their associated sources and destinations and SLAs.
6. Optionally, the cost to the user of using each link, in terms of capital cost or relative cost.

It will be appreciated that this use of manual input and/or automatic learning protocols is a significant departure from Internet and similar networks, where the network must learn, independently, the topology and logical links of the network. This serves to speed up the process of optimization of the network, and to reduce the utilization of network resources for unnecessary calculations.

A required link scheme including each logical link is input (block 26), including a source port switch and destination port switch. The logical link required bandwidth in bps is defined, together with any logical link required bandwidth parameters, such as required committed information rate (CIR) and/or required Peak information rate (PIR) and/or required maximum burst size (MBS). Finally, if desired, a protection scheme may be provided, i.e., an optional parameter enabling establishment of a pre-configured alternate route for physical link resilience and restoration, in case the main physical link fails. It will be appreciated that, in this case, the network devices support a resilience scheme.

After receiving all the input data, the management station computes the optimal routing scheme (block 28) given the input parameters, preferably according to some or all of the following constraints or metrics, according to the user's preferences, which were also input by the user during previous steps:

1. Improved network throughput.
2. Utilizing the shortest paths possible (in order to minimize delay).
3. Providing even distribution and use of network bandwidth resources (to provide a more stable network and fewer network-wide re-routes), which may be defined, for example, by the variance between the links as being less than a pre-defined percentage.
4. Minimizing the $$\text{ratio} \frac{\sum PIR - \sum CIR}{\text{Link\_Capacity} - \sum CIR}.$$

to a predefined or calculated value, for each and every link. In this way, non-committed traffic will not be heavily over subscribed.

5. Limiting aggregated CIR and MBS traffic at any physical link to less than that set by the user.
6. Minimizing the cost of routes, meaning that links that cost more to the user (for example, long distance lines as opposed to local lines) will be used less, as much as possible.

Once the network routes have been computed, the management system performs a sanity check (block 30). This means that it verifies that the required logical links and their associated parameters can be allocated in the network, i.e., that there is sufficient bandwidth, and the proper physical links exist (including limiting aggregated CIR traffic at any physical link to less than the available bandwidth at that physical link). If the sanity check is not passed, the management station notifies the user and suggests a change in the logical link parameters (block 26).

Once the sanity check is passed, the management station configures the network devices (block 32). The management station converts the routing paths, computed at the previous steps, to routing tables, including, in Ethernet networks, MPLS label forwarding tables, MAC (Media Access Control) or any other type of classifier, and sends the routing tables to the various configurable switches (network devices), together with configuration commands, using any standard management protocol. The network now starts running using the configured routes (block 34).

It will be appreciated that the system of the present invention does not have to depend on dynamic real-time learning of the topology of the network, as do most conventional Ethernet and IP type networks. Rather, the topology of the network is input into the management station, so the devices of the present network need not independently learn the network topology. This results in substantial savings of time and resources while running the network, as discussed above.

According to one embodiment of the invention, private MAC addresses, known and used only inside the network, are assigned to various nodes or devices in the network. It will be appreciated that the private address need not necessarily be a MAC address, but can be any other address given to the nodes in the network. (such as, for example, IP addresses or MPLS paths) These private network addresses may be randomly generated, or may be generated according to pre-selected rules. It will be appreciated by those skilled in the art that these private network addresses can also be used to carry information about each flow through that physical link. This information can indicate, for example, the type of service, whether or not there is protection, routing information for the routing hierarchy, etc.

The use of private network addresses provides additional protection to the network against hackers and other unauthorized individuals attempting to access nodes in the network. If desired, each customer may be assigned a single private network address for all its stations, and individual stations within the customer will retain their conventional MAC addresses for both internal and external use. In this way, the number of addresses required within the network (and therefore, in the routing tables) can be significantly reduced, thereby reducing the processing time and increasing the efficiency of routing within the network. Selection of random private network addresses or generation of private network addresses according to pre-defined rules may be carried out in the management station. Alternatively, if the quasi-static algorithm is distributed among several switching devices, the address assignment instructions will also be distributed for carrying out in the switching devices.

Figure 3:
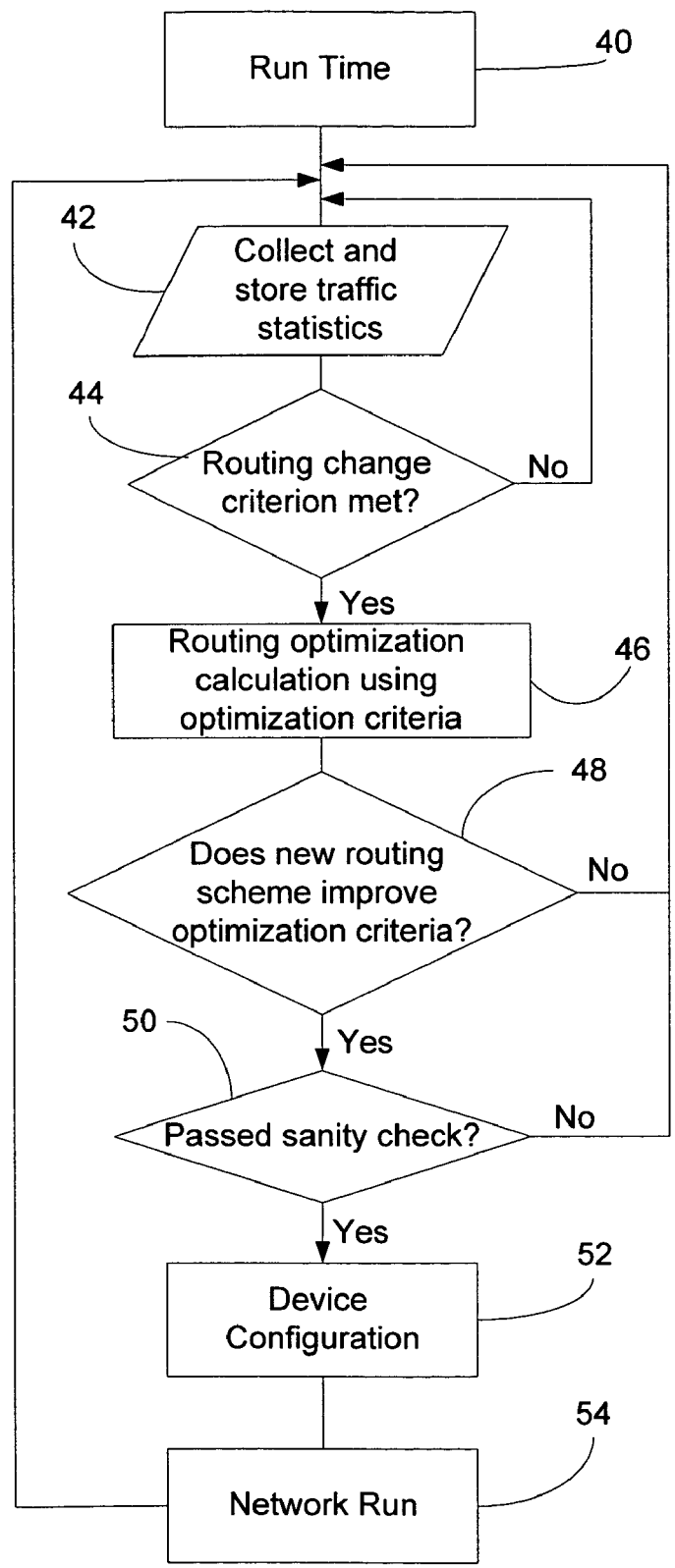
FIG. 3 is a flow chart illustrating a network run-time mode of operation of a network according to one embodiment of the invention.

Referring now to FIG. 3, there is shown a flow chart illustrating a network run-time mode of operation of a network according to a preferred embodiment of the invention. In this mode of operation, the network routing is adapted to network traffic patterns when pre-defined criteria are met. In other words, the system collects and stores information about the data traffic loads over time passing through the various nodes, and updates itself accordingly, so as to approach an optimum utilization of network resources.

Thus, the network runs for a period of time utilizing the device configuration generated using the original input parameters, or the device configuration most recently updated by the network (block 40). While the system is running, each network device collects statistics (block 42) about the utilization of each physical link connected to it, in terms of bandwidth usage over time. This information is sent to the management station using any signaling protocol. The management station stores the data and processes the data to calculate various traffic statistics, particularly mean bandwidth utilization or demand, its variance, and bandwidth and variance distribution over time, as well as a probability of bandwidth utilization. When at least one pre-defined criterion for a routing change is met (block 44), the management station initiates recalculation of the routing scheme based on the calculated traffic statistics (block 46). This routing optimization calculation utilizes optimization criteria selected by the user in advance and input into the management station. These criteria may include utilizing the shortest possible paths, providing substantially uniform distribution of traffic in the network, increasing traffic throughput through the core network (bandwidth entering and leaving the network), among others, as selected by the user.

According to a preferred embodiment of the present invention, this newly calculated routing scheme will not be implemented unless it provides an overall improvement in bandwidth utilization in the network, as measured by one or more network metrics selected in advance by the user. These metrics may include more uniform distribution of traffic in the network, increased traffic throughput through the core network, etc., and the probability of an improvement and the size of the improvement must be above threshold values selected by the user (i.e., a 90% probability that the throughput will increase by at least 10%).

According to this embodiment of the present invention, recalculation of the routing scheme and reconfiguration of the network are not dynamic, i.e. occurring in real-time, but rather take place only when threshold values of pre-defined criteria are reached. For example, as stated above, the management station calculates traffic statistics, including the mean and variance distribution over time and, from these, the probability value of bandwidth utilization, for each of the logical flows. This bandwidth probability value is compared with the input bandwidth utilization probability threshold value. As long as the detected bandwidth utilization changes with a probability lower than the input value or for less than the minimal period of time, the management station continues to collect and store information and process it to traffic statistics (block 42).

When the detected bandwidth utilization changes with at least the input probability for a period of time above the minimum threshold value, the management station executes route optimization and calculates a new routing scheme for the network (block 46), utilizing the collected and calculated traffic data and statistics together with the various input network parameters. In this way, the recalculated and updated routing scheme is better adapted to network behavior, and is adapted to provide better and more uniform distribution of traffic over the entire network (as by offloading busy paths and loading unused paths), to provide maximum usage of cheaper paths (using cost function), and/or taking into account any other criteria the user defines. It will be appreciated that all these steps are preferably performed off-line while the network is running. This means that changes in the routing scheme are implemented relatively slowly relative to the data transfer rate through the network.

The management station now determines whether the newly calculated routing scheme increases the network throughput (the total delivered bandwidth) or any other chosen metrics for the network (block 48). If not, the management station continues to collect and store information and process the information into traffic statistics (block 42). If the metrics are improved, the management station performs a sanity check (block 50).

Once the sanity check is passed, the management station converts the routing paths, computed at the previous steps, to routing tables for the new device configuration (block 52), including, in Ethernet networks, MPLS label forwarding tables, MAC (Media Access Control) or any other type of classifier, and sends configuration commands to the various configurable switches using any standard management protocol. Once this has been done and verified, it is preferably put into effect "simultaneously" through the whole network, assuming reasonable clock coherence between the nodes. This may be ensured by utilizing, for example, a GPS clock. Alternatively, assuming every core node has a direct link to at least one configurable switch, it is sufficient to synchronize the configurable edge switches and have the edge nodes simultaneously trigger the update in the core nodes. Thus, all the switches are synchronized so that conversion to the new routing paths occurs substantially simultaneously. At that time, the network starts running using the newly configured routes (block 48).

It will be appreciated that, according to a preferred embodiment of the present invention, three different sets of criteria may be input by the user during initialization. One set of criteria includes the various routing change criteria for initiating computation of new routing tables (i.e., probability of bandwidth utilization). Another set includes the optimization criteria for use in making these computations of new routing schemes (uniform distribution, shortest paths). A third set includes reconfiguration criteria for deciding whether or when to reconfigure the network in accordance with the newly calculated routing scheme (i.e., improvement of throughput or other metrics above a desired percentage change).

It will further be appreciated that the exemplary routing system of the present invention provides for periodic device reconfiguration not only on the basis of collected data about the actual state of the network over a given period of time, but also in response to changes in the network topology.

Figure 4:
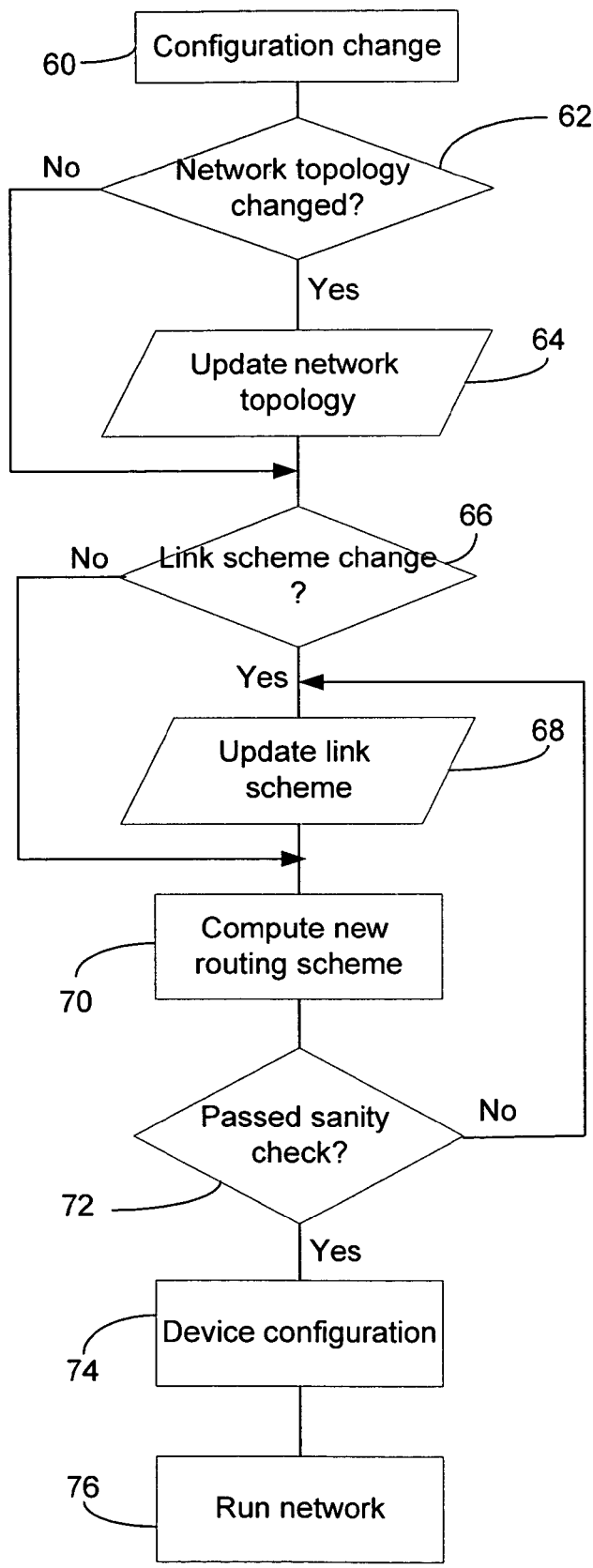
FIG. 4 is a flow chart illustrating a configuration change mode of operation of a network according to one embodiment of the invention.

FIG. 4 is a flow chart illustrating a configuration change mode of operation of a network according to one embodiment of the present invention. At any time, the user may change the network topology by adding or removing devices and physical links. The user may also provision, remove or change new or existing services over the existing topology, changes in logical links, or change topology and update the services at once. The process of configuration change is similar to that of network initialization with the added benefit of the information collected on the network in the run time mode.

When the user inputs new parameters for a configuration change to the management station (block 60), the management station determines whether the network topology has changed and a topology update is required (block 62). If so, in order for the management station to know the new network topology so it can compute updated routes, initial parameters of the network changes must be input into the management station (block 64). These parameters include the number of added and/or removed switches, the number of ports on each switch, the available bandwidth on each port, identifiers of each port, and the modified physical connection scheme of the network elements, i.e., which port is connected to which other port by which physical link.

If the network topology has not changed or, if it has, once the network topology has been updated, the management station determines whether the logical link scheme requires a change (i.e., whether a new provisioning table is required) (block 66). All the required added and/or removed physical links and their respective parameters are then configured. A logical link route is defined, including a source port switch and destination port switch. The required bandwidth for the logical link in bps is defined, together with any required bandwidth parameters, such as required committed information rate (CIR) and/or required peak information rate (PIR) and/or required maximum burst size (MBS). Finally, if desired, a protection scheme is provided, for example, an optional parameter enabling switching to a pre-configured alternate route for physical link resilience and restoration, in case the main physical link fails. It will be appreciated that, in this case, the network devices support a resilience scheme.

Once the required logical link scheme has been updated (block 68), the management station computes the optimal routes (block 70) given the newly input parameters, together with the collected statistics on the utilization of each path. Preferably, the optimal routes provide the shortest paths possible, substantially even distribution and use of network bandwidth resources, limitation of aggregated CIR traffic at any physical link to less than the available bandwidth at that physical link, and optionally, limitation of aggregated CIR and MBS traffic at any physical link to less than that set by the user. After route computation, the management station performs a sanity check (block 72), verifying that the required logical links and their associated parameters can be allocated in the network. If not, the management station notifies the user and suggests a change in the logical link parameters (block 68). After successfully passing the sanity check, the network devices are reconfigured (block 74) with new routing tables utilizing the routing paths computed at the previous steps, and, at a synchronized time, the network starts running using the newly configured routes (block 76).

Thus, the present invention provides centralized routing in a packet-based network or routing domain, based on statistics of the past history and present usage or demand of the network. These global routing schemes may be calculated in a central management station as described above, in one or more of the network devices, or in all of the network devices simultaneously, if all the devices have the same software and share all network traffic statistics. Thus, according to an alternative embodiment of the present invention, the computer program for implementing the method of the invention is provided in all of the network devices, each of which receives all the traffic data from all the other devices and calculates the identical statistics and identical routing scheme. Alternatively, one or more switching devices may receive all the traffic data and utilize them to calculate all the network statistics and perform the additional processing for all the switching devices in the network.

While the present invention has been described with respect to a limited number of embodiments, it will be appreciated that many variations, modifications and other applications of the present invention may be made. It will further be appreciated that the present invention is not limited to what has been described hereinabove merely by way of example. Rather, the present invention is limited solely by the claims which follow.

The invention claimed is:

1. A method for routing data over a telecommunications carrier network whose topology includes a plurality of switching devices defining a plurality of physical links, and a plurality of traffic flows through at least one of the physical links in the network, each of the traffic flows being associated with a Service Level Agreement (SLA) and having specific routing from a routing scheme computed for the entire network that is based on the flows' SLAs and network parameters, the method comprising:

inputting network parameters into a processor;

collecting data of traffic transmitted over at least some of the traffic flows;

calculating global traffic statistics for the entire network for all the flows, based on the collected data, in said processor;

determining, in said processor, from the input network parameters and from the calculated traffic statistics, whether any pre-defined criteria for route recalculation are met, wherein the pre-defined criteria include a change in network parameters and a pre-determined amount of change in at least one of the calculated traffic statistics; and recalculating in said processor the routing scheme for the entire network, based on the input network parameters, the calculated statistics, and the set of SLAs, when any of the pre-defined criteria for route recalculation is met so as to optimize performance of the entire network according to a pre-defined criterion; and routing incoming data through the switching devices according to said recalculated routing scheme.

2. The method according to claim 1, further comprising reconfiguring network devices in the network according to said re-calculated routing scheme.

3. The method according to claim 2, wherein the reconfiguring step includes reconfiguring substantially simultaneously each of the at least two switching devices.

4. The method according to claim 1, further comprising:

defining in advance the pre-defined criteria for recalculation of said routing system configuration; and wherein the re-calculating step includes re-calculating the routing system configuration only when any of the pre-defined criteria is met.

5. The method according to claim 4, wherein said pre-defined criteria for recalculation of the routing system configuration include:

a change in network topology;

a change in at least one logical link;

a change in at least one selected monitored statistic;

a change of bandwidth utilization of at least one logical link above a pre-defined probability threshold value;

passage of a pre-selected period of time;

a change in a Quality of Service requirement;

a repeating pattern of bandwidth utilization.

6. The method according to claim 2, further comprising the step of determining whether the re-calculated routing scheme improves at least one selected metric in said network, before said step of reconfiguring.

7. The method according to claim 6, wherein said metric is selected from:

better network throughput;

utilizing shortest possible paths;

providing even distribution and use of network bandwidth resources;

minimizing a ratio $$\text{ratio} \frac{\sum PIR - \sum CIR}{\text{Link\_Capacity} - \sum CIR}$$

to a predefined or calculated value, for each and every link;
limiting aggregated CIR and MBS traffic at any physical link to less than a value set by the user; and
minimizing an overall cost of said routes.

8. The method according to claim 1, wherein the telecommunications carrier network is an Ethernet network.

9. The method according to claim 8, further comprising assigning a private network address to each of said devices.

10. The method according to claim 9, wherein each said private network address includes information relating to at least one of said traffic flows.

11. The method according to claim 1, further comprising storing said traffic statistics.

12. The method according to claim 1, wherein said steps of collecting through re-calculating are implemented off-line.

13. The method according to claim 1, wherein at least one of said switching devices includes a processor, and said steps of collecting through re-calculating are implemented in said processor.

14. The method according to claim 13, further comprising implementing an initialization mode for the network, comprising the steps of:
inputting initial topology parameters into said processor;
inputting into said processor the pre-defined criteria for re-calculation of the routing scheme;
causing the processor to devise a provisioning table from said initial parameters;
defining all required logical links;
performing a sanity check;
computing preliminary routes according to said input initial parameters, after successfully passing the sanity check;
preparing routing tables according to said preliminary routes; and
configuring all network devices by transferring said prepared routing tables to said network devices together with configuration commands.

15. The method according to claim 1, further including:
inputting a threshold value of probability of bandwidth utilization and a minimum period of time over which said probability must exceed said threshold value in a network;
calculating a bandwidth utilization probability value for each logical link;
comparing said calculated bandwidth utilization probability value with said input bandwidth utilization probability threshold value;
comparing a calculated period of time of said probability with the input time threshold value; and
if the value of the probability of bandwidth utilization over time exceeds the permitted threshold values, recalculating said routing scheme; and
implementing said recalculated routing scheme.

16. The method according to claim 15, further comprising the step of determining whether the recalculated routing scheme increases throughput through said network, before said step of implementing.

17. The method according to claim 15, further comprising providing a configuration change mode of operation for the network comprising:
inputting to said processor new parameters for a configuration change;
providing a new provisioning table based on said input traffic flows and said new parameters;
reconfiguring all added and/or removed physical links;
recalculating said routing scheme utilizing said newly input parameters, together with said calculated traffic statistics; and
reconfiguring all said network devices with new routing tables utilizing said recalculated routing scheme.

18. The method according to claim 1, further comprising continually repeating said steps of collecting and calculating.

19. The method according to claim 1, further comprising storing said calculated statistics; and
wherein said step of calculating includes calculating, from said stored statistics, updated traffic statistics for each of said flows in the network.

20. The method according to claim 13, wherein said processor includes a computer program for defining the routing scheme for routing the data through the network, for configuring the switching devices according to the routing scheme, for determining whether the pre-defined criteria for reconfiguring the switching devices has been met, for re-defining the routing scheme when any of the pre-defined criteria has been met, and for reconfiguring the switching devices according to the re-defined routing scheme.

21. The method according to claim 13, wherein each switching device includes an identical computer program for defining the routing scheme for routing the data through the network, for configuring the switching devices according to the routing scheme, for determining whether the pre-defined criteria for reconfiguring the switching devices has been met, for identically re-defining the routing scheme when any of the pre-defined criteria has been met, and for reconfiguring the switching devices according to the re-defined routing scheme.

22. The method of claim 1, wherein the SLA of a traffic flow includes at least one guaranteed bandwidth parameter selected from the group consisting of: a committed information rate (CIR), a peak information rate (PIR), and a maximum burst size (MBS).

23. The method according to claim 1, further comprising reconfiguring the network devices in the network according to the re-calculated routing scheme when any of the pre-defined criteria for re-configuration is met.

24. The method according to claim 1, further comprising, before the step of collecting data, the steps of:
receiving input data of network topology, of the traffic flows, of the SLAs and of the physical links;
calculating, from the received data, a routing scheme for the entire network;
performing a sanity check on the routing scheme; and
when the sanity check is passed, provisioning all the devices in the network according to the routing scheme.

25. A network management station for a telecommunications carrier network having a topology including at least two switching devices defining at least one physical link, the management station comprising:
a processor for coupling to the at least two switching devices, the processor configured to receive definitions of the network topology and a plurality of traffic flows, each of the traffic flows associated with a Service Level Agreement (SLA) and with specific routing though at least one physical link in the network,
the processor further configured to access computer readable instructions, which, when implemented by the processor, cause the processor to:
receive input network parameters;

receive collected data of traffic transmitted over at least some of the traffic flows;

calculate global traffic statistics for all of the traffic flows in the network based on the collected data;

determine, from the input network parameters and from the calculated traffic statistics, whether any pre-defined criteria for route recalculation is met, wherein the pre-defined criteria include a change in network parameters and a pre-determined amount of change in at least one of the calculated traffic statistics; and re-calculate a routing scheme for the entire network, utilizing the calculated traffic statistics, the input network parameters, and the SLAs, so as to optimize performance of the entire network according to a pre-defined criterion, when any of the pre-defined criteria for route recalculation is met.

26. The network management station according to claim 25, further comprising: a user interface, the processor configured to receive said definitions of the plurality of traffic flows from a user via the user interface.

27. The network management station according to claim 25, wherein said processor is further configured to assign a private network address to each of said devices.

28. The network management station according to claim 27, wherein each said private network address includes information relating to at least one of said traffic flows.

29. A switching device for a telecommunications carrier network having a topology including at least two switching devices defining at least one physical link, the switching device comprising:

a processor for coupling to the at least two switching devices, the processor configured to receive definitions of the network topology and a plurality of traffic flows, each of the traffic flows associated with a Service Level Agreement (SLA) and with specific routing though at least one physical link in the network, the processor further configured to access computer readable instructions which, when implemented by the processor, cause the processor to:

receive input network parameters;

receive collected data of traffic transmitted over at least some of the traffic flows;

calculate global traffic statistics for all of the traffic flows in the network based on the collected data;

determine, from the input network parameters and the calculated traffic statistics, whether any pre-defined criteria for route recalculation is met, wherein the pre-defined criteria include a change in network parameters and a pre-determined amount of change in at least one of the calculated traffic statistics; and re-calculate a routing scheme for the entire network, utilizing the calculated traffic statistics, the input network parameters, and the SLAs, so as to optimize performance of the entire network according to a pre-defined criterion, when any of the pre-defined criteria for route recalculation is met.

30. The switching device according to claim 29, further comprising: a user interface, the processor configured to receive said definitions of the plurality of traffic flows from a user via the user interface.

31. The switching device according to claim 29, wherein said processor is further configured to assign a private network address to each of said devices.

32. The switching device according to claim 31, wherein each said private network address includes information relating to at least one of said traffic flows.

33. A non-transitory computer-readable storage medium containing a set of instructions for a computer, the set of instructions, when executed by the computer, causing the computer to perform the following steps:

receiving network parameters of a telecommunications carrier network having pre-defined traffic flows, each of the traffic flows being associated with a Service Level Agreement (SLA) and with specific routing though at least one physical link in the network;

collecting data of traffic transmitted over at least some of the traffic flows;

calculating global traffic statistics for all of the traffic flows in the network, based on the collected data;

determining, from the network parameters and the calculated traffic statistics, whether any pre-defined criteria for route recalculation is met, wherein the pre-defined criteria include a change in network parameters and a pre-determined amount of change in at least one of the calculated traffic statistics; and re-calculating the routing scheme for the entire network, based on the input network parameters, the calculated traffic statistics and the set of SLAs, so as to optimize performance of the entire network according to a pre-defined criterion, when any of the pre-defined criteria for route recalculation is met.

34. The computer-readable storage medium according to claim 33, wherein the set of instructions, when executed by the computer, further cause the computer to perform the following steps:

receiving the pre-defined traffic flows from a user.

35. The computer-readable storage medium according to claim 34, wherein the set of instructions, when executed by the computer, further cause the computer to perform the following step, before the step of collecting: configuring a routing system for the telecommunications carrier network according to the pre-defined traffic flows.

* * * * *